(12) United States Patent
Yanagi et al.

(10) Patent No.: US 12,472,917 B2
(45) Date of Patent: Nov. 18, 2025

(54) BRAKE SYSTEM

(71) Applicant: DENSO CORPORATION, Kariya (JP)

(72) Inventors: Toshiaki Yanagi, Kariya (JP); Yoshinori Inuzuka, Kariya (JP)

(73) Assignee: DENSO CORPORATION, Aichi-pref. (JP)

( * ) Notice: Subject to any disclaimer, the term of this patent is extended or adjusted under 35 U.S.C. 154(b) by 60 days.

(21) Appl. No.: 18/538,668

(22) Filed: Dec. 13, 2023

(65) Prior Publication Data
US 2024/0116483 A1 Apr. 11, 2024

Related U.S. Application Data

(63) Continuation of application No. PCT/JP2022/021972, filed on May 30, 2022.

(30) Foreign Application Priority Data

Jul. 16, 2021 (JP) .................. 2021-118218

(51) Int. Cl.
| | |
|---|---|
| *B60T 8/92* | (2006.01) |
| *B60T 7/04* | (2006.01) |
| *B60T 8/171* | (2006.01) |
| *B60T 8/88* | (2006.01) |
| *B60T 17/22* | (2006.01) |
| *G01B 7/30* | (2006.01) |
| *G01D 5/20* | (2006.01) |

(52) U.S. Cl.
CPC ................ *B60T 8/92* (2013.01); *B60T 7/042* (2013.01); *B60T 8/171* (2013.01); *B60T 8/885* (2013.01); *B60T 17/22* (2013.01); *G01B 7/30* (2013.01); *G01D 5/20* (2013.01); *B60T 2220/04* (2013.01); *B60T 2270/413* (2013.01)

(58) Field of Classification Search
CPC .................................. B60T 8/92; B60T 17/22
See application file for complete search history.

(56) References Cited

U.S. PATENT DOCUMENTS

| | | | |
|---|---|---|---|
| 6,349,996 B1 | 2/2002 | Heckmann et al. | |
| 10,351,117 B2 * | 7/2019 | Isono | ...................... B60T 1/062 |

(Continued)

FOREIGN PATENT DOCUMENTS

JP 2009029416 A 2/2009

*Primary Examiner* — Long T Tran
(74) *Attorney, Agent, or Firm* — Nixon & Vanderhye PC

(57) ABSTRACT

A position detection device has at least four sensors outputting signals according to an operation amount of a brake pedal. Output signals from at least two sensors are input to a first ECU in a distinguishable manner. Output signals of at least two other sensors other than the sensor whose output signals are input to the first ECU are input to a second ECU in a distinguishable manner. A signal transmission unit transmits output signals of at least two sensors input to one of the first ECU and the second ECU to the other of the first ECU and the second ECU in a distinguishable manner. The first ECU and the second ECU identify an output signal indicating an abnormal value based on the output signals of at least four sensors, detect an operation amount of the brake pedal based on a plurality of output signals excluding an abnormal value.

9 Claims, 9 Drawing Sheets

(56) References Cited

U.S. PATENT DOCUMENTS

| | | | |
|---|---|---|---|
| 2005/0131613 A1* | 6/2005 | Bohm | B60T 7/042 |
| | | | 701/71 |
| 2005/0173980 A1* | 8/2005 | Bohm | B60T 7/042 |
| | | | 303/155 |
| 2006/0232128 A1 | 10/2006 | Weiberle et al. | |
| 2008/0224533 A1* | 9/2008 | Nakada | B60T 8/4059 |
| | | | 303/10 |
| 2010/0095755 A1* | 4/2010 | Isono | G05G 1/46 |
| | | | 73/132 |
| 2010/0198473 A1* | 8/2010 | Strengert | B60T 17/221 |
| | | | 701/70 |
| 2018/0215368 A1* | 8/2018 | Isono | B60T 13/741 |
| 2018/0236876 A1* | 8/2018 | Isono | B60T 13/746 |
| 2021/0053540 A1 | 2/2021 | Besier et al. | |
| 2022/0055582 A1* | 2/2022 | Takimoto | G01R 33/072 |
| 2022/0297645 A1* | 9/2022 | Yanagida | B60T 13/662 |
| 2022/0297649 A1* | 9/2022 | Yanagida | B60T 8/326 |
| 2023/0054790 A1* | 2/2023 | Seol | B60T 11/18 |

\* cited by examiner

US 12,472,917 B2

BRAKE SYSTEM

CROSS REFERENCE TO RELATED APPLICATIONS

This application is a continuation application of International Patent Application No. PCT/JP2022/021972 filed on May 30, 2022, which designated the U.S. and based on and claims the benefits of priority of Japanese Patent Application No. 2021-118218 filed on Jul. 16, 2021. The entire disclosure of all of the above applications is incorporated herein by reference.

TECHNICAL FIELD

The present disclosure relates to a brake system installed in a vehicle.

BACKGROUND

Conventionally, in a brake-by-wire system, an electronic control unit drives and controls a brake circuit based on an operation amount of a brake pedal that is depressed and operated by a driver to brake the vehicle. Hereinafter, the electronic control unit will be referred to as "ECU". ECU is an abbreviation for Electronic Control Unit.

SUMMARY

An object of the present disclosure is to provide a brake system capable of enhancing the safety of braking control of a vehicle against failure of a sensor that outputs a signal corresponding to the operation amount of a brake pedal.

According to one aspect of the present disclosure, a brake system configured to drive and control a brake circuit that brakes a vehicle includes a brake pedal device, a position detection device, a first ECU, a second ECU, and a signal transmission unit. The brake pedal device has a brake pedal that is swingable around a predetermined axis with respect to a fixed body that is fixed to the vehicle. The position detection device has at least four sensors that output signals according to the operation amount of a brake pedal depressed by the driver. Output signals of at least two sensors out of at least four sensors are respectively input to the first ECU in a distinguishable manner. Output signals of at least two sensors out of at least four sensors other than the sensor whose output signal are input to the first ECU are respectively input to the second ECU in a distinguishable manner. The signal transmission unit is capable of transmitting output signals of at least two sensors input to one of the first ECU and the second ECU to the other of the first ECU and the second ECU in a distinguishable manner. Then, the first ECU and the second ECU are configured to identify an output signal indicating an abnormal value based on the output signals of at least four sensors, detect an operation amount of the brake pedal based on a plurality of output signals excluding an abnormal value, and drive and control the brake circuit.

DETAILED DESCRIPTION

Figure 1:
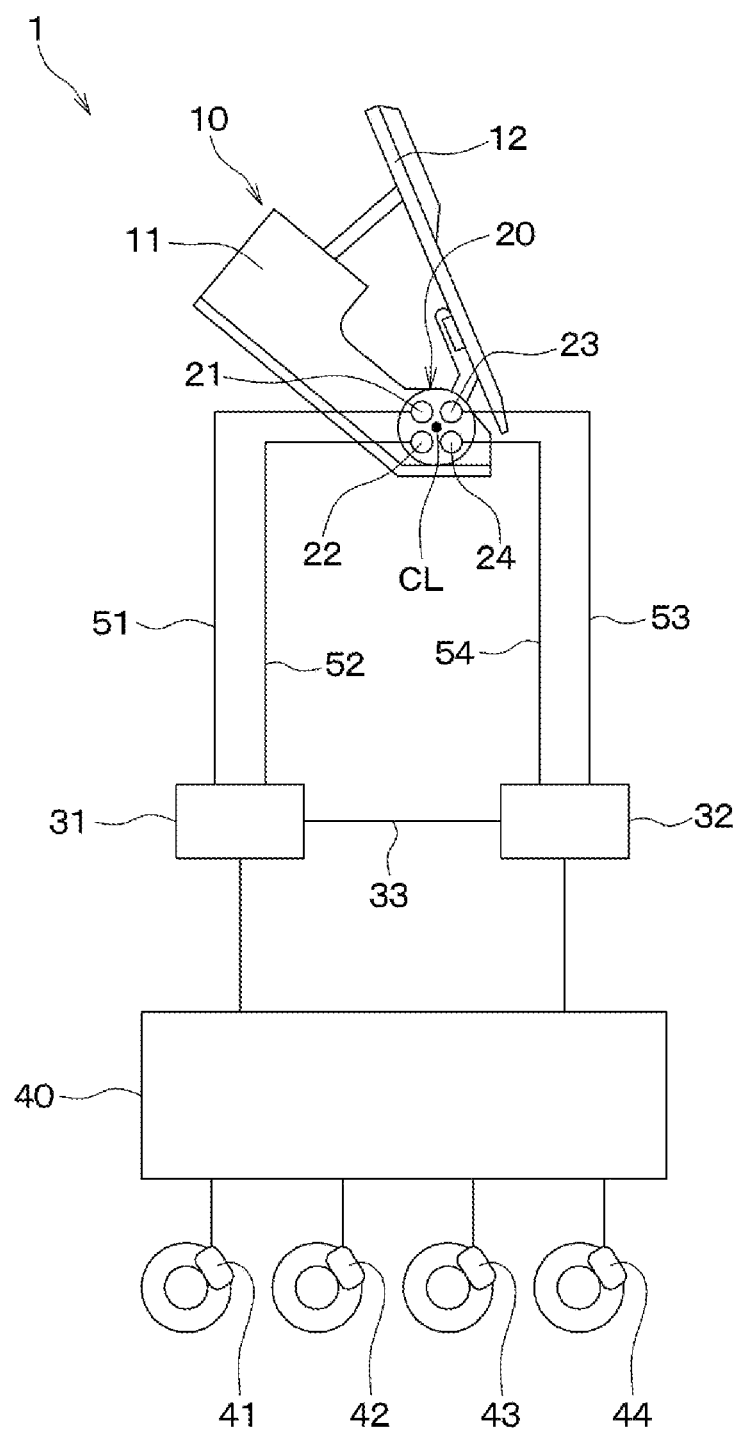
FIG. 1 is a diagram showing a schematic configuration of a brake system according to a first embodiment.

In a brake-by-wire system of an assumable example, an electronic control unit drives and controls a brake circuit based on an operation amount of a brake pedal that is depressed and operated by a driver to brake the vehicle. Hereinafter, the electronic control unit will be referred to as "ECU". ECU is an abbreviation for Electronic Control Unit.

The brake system is configured to drive and control a brake circuit by two ECUs. This brake system is configured such that when one of the two ECUs fails, the other ECU drives and controls the brake circuit. In addition, the two ECUs are called a first and second control and regulating unit.

However, the brake system described above has a configuration in which four sensors for detecting the operation amount of the brake pedal and two ECUs are connected by two signal lines. According to studies by the disclosers, the brake system is considered to have the following problems. Regarding the configuration of the brake system described above, specifically, a description will be given assuming that a first sensor, a second sensor, and a first ECU are connected by a first signal line, and a third sensor, a fourth sensor, and a second ECU are connected by a second signal line.

(1) When one of the first sensor and the second sensor fails, the first ECU cannot specify which of the first sensor and the second sensor has failed. Similarly, when one of the third sensor and the fourth sensor fails, the second ECU cannot specify which of the third sensor and the fourth sensor has failed.

(2) When one of the first sensor and the second sensor fails and one of the third sensor and the fourth sensor fails, both the first ECU and the second ECU cannot drive and control the brake circuit.

(3) When a signal indicating the operation amount of the brake pedal transmitted from the first signal line to the first ECU is different from a signal indicating the operation amount of the brake pedal transmitted from the second signal line to the second ECU, the first ECU and the second ECU cannot identify which of the two signals is correct.

An object of the present disclosure is to provide a brake system capable of enhancing the safety of braking control of a vehicle against failure of a sensor that outputs a signal corresponding to the operation amount of a brake pedal.

According to one aspect of the present disclosure, a brake system configured to drive and control a brake circuit that brakes a vehicle includes a brake pedal device, a position detection device, a first ECU, a second ECU, and a signal transmission unit. The brake pedal device has a brake pedal that is swingable around a predetermined axis with respect to a fixed body that is fixed to the vehicle. The position detection device has at least four sensors that output signals according to the operation amount of a brake pedal depressed by the driver. Output signals of at least two sensors out of at least four sensors are respectively input to the first ECU in a distinguishable manner. Output signals of at least two sensors out of at least four sensors other than the sensor whose output signal are input to the first ECU are respectively input to the second ECU in a distinguishable manner. The signal transmission unit is capable of transmitting output signals of at least two sensors input to one of the first ECU and the second ECU to the other of the first ECU and the second ECU in a distinguishable manner. Then, the first ECU and the second ECU are configured to identify an output signal indicating an abnormal value based on the output signals of at least four sensors, detect an operation amount of the brake pedal based on a plurality of output signals excluding an abnormal value, and drive and control the brake circuit.

In the following description, the operation amount of the brake pedal may be simply referred to as "operation amount".

In the above aspect, output signals of at least two sensors that are input to one of the first ECU and the second ECU are transmitted to the other of the first ECU and the second ECU via the signal transmission unit in a distinguishable manner. Thereby, the first ECU and the second ECU acquire output signals of at least four sensors in a distinguishable manner. Therefore, the first ECU and the second ECU can identify an output signal indicating an abnormal value by comparing the output signals of at least four sensors. Therefore, the first ECU and the second ECU can detect an accurate operation amount based on a plurality of normal output signals excluding the output signal having the abnormal value, and drive and control the brake circuit. As a result, the braking system can increase the safety of vehicle braking control against sensor failure.

Further, when the output signals of at least two sensors out of the output signals of at least four sensors indicate the same operation amount, the first ECU and the second ECU can identify the output signals of two sensors indicating different operation amount as an output signal indicating an outlier. Therefore, even if multiple sensors fail, the brake system can accurately detect the operation amount of the brake pedal based on multiple normal output signals, excluding abnormal values, and drive and control the brake circuit.

Hereinafter, embodiments of the present disclosure will be described with reference to the drawings. In the following embodiments, the same or equivalent parts are denoted by the same reference numerals as each other, and explanations will be provided to the same reference numerals.

First Embodiment

A first embodiment will be described with reference to the drawings. As shown in FIG. 1, a brake system 1 of the present embodiment is a system that brakes the vehicle and in which the electronic control units 31 and 32 drive a brake circuit 40 based on electrical signals output from a plurality of sensors 21 to 24 provided in a brake pedal device 10. That is, the brake system 1 of the present embodiment is a brake-by-wire system. Hereinafter, the electronic control unit will be referred to as "ECU".

As shown in FIG. 1, the brake system 1 of the present embodiment includes a brake pedal device 10, a position detection device 20, a first ECU 31, a second ECU 32, a signal transmission unit 33, and the like.

The brake pedal device 10 includes a housing 11 as a fixed body fixed to the vehicle, a brake pedal 12 provided oscillatably with respect to the housing 11, and the like. The brake pedal 12 oscillates around a predetermined axis CL by a driver's stepping operation. In this specification, the term "oscillate" refers to rotation in forward and reverse directions within a predetermined angular range around the predetermined axis CL.

Further, the brake pedal device 10 is provided with the position detection device 20 having at least four sensors 21 to 24. In FIG. 1, the four sensors 21 to 24 provided inside the housing 11 of the brake pedal device 10 are schematically illustrated on the side surface of the housing 11 for convenience of explanation. In the description of the first embodiment, the four sensors 21 to 24 of the position detection device 20 are called a first sensor 21, a second sensor 22, a third sensor 23 and a fourth sensor 24. Each of the four sensors 21 to 24 outputs a signal corresponding to an operation amount of the brake pedal 12 depressed by the driver. The operation amount of the brake pedal 12 includes the angle at which the brake pedal 12 oscillates around the predetermined axis CL, and a movement distance of the brake pedal 12 or a member that moves together with the brake pedal 12. A specific configuration of the position detection device 20 will be described later.

The output signals of the four sensors 21 to 24 are input to the first ECU 31 and the second ECU 32 via the first to fourth signal lines 51 to 54. In the first embodiment, the first sensor 21 and the first ECU 31 are electrically connected by the first signal line 51, and the second sensor 22 and the first ECU 31 are electrically connected by the second signal line 52. Therefore, the output signals of the first sensor 21 and the second sensor 22 are respectively input into the first ECU 31 in a distinguishable manner.

Also, the third sensor 23 and the second ECU 32 are electrically connected by a third signal line 53, and the fourth sensor 24 and the second ECU 32 are electrically connected by a fourth signal line 54. Therefore, the output signals of the third sensor 23 and the fourth sensor 24 are respectively input into the second ECU 32 in a distinguishable manner. The first to fourth signal lines 51 to 54 are configured by, for example, a wire harness or a predetermined in-vehicle LAN (Local Area Network).

Both the first ECU 31 and the second ECU 32 are configured by a microcomputer including a processor that performs control processing and arithmetic processing, a storage unit such as ROM and RAM that stores programs and data, and its peripheral circuits. The storage unit includes non-transitory tangible storage media. Each of The first ECU 31 and the second ECU 32 performs various control processing and arithmetic processing based on the programs stored in the storage unit, and control the operation of each device connected to the output port. Specifically, the first ECU 31 and the second ECU 32 are configured to detect the operation amount of the brake pedal 12 based on the output signals of the first to fourth sensors 21 to 24 so as to drive and control the brake circuit 40.

The first ECU 31 and the second ECU 32 are connected as a signal transmission unit 33 through an in-vehicle LAN such as CAN (Controller Area Network) communication, so that information can be transmitted to each other. Therefore, the output signals of the first sensor 21 and the second sensor 22 input to the first ECU 31 are transmitted to the second ECU 32 via the signal transmission unit 33 in a distinguishable manner. Further, the output signals of the third sensor 23 and the fourth sensor 24 input to the second ECU 32 are transmitted to the first ECU 31 via the signal transmission unit 33 in a distinguishable manner. Therefore, both the first ECU 31 and the second ECU 32 can acquire the output signals of the first to fourth sensors 21 to 24 in a distinguishable manner.

The first ECU 31 and the second ECU 32 are configured to be capable of dealing with failures of the first to fourth sensors 21 to 24, disconnection or short circuit of the first to fourth signal lines 51 to 54, and the like. Specifically, the first ECU 31 and the second ECU 32 compare the output signals of the first to fourth sensors 21 to 24 when there is an output signal indicating an abnormal value among the output signals of the first to fourth sensors 21 to 24. By doing so, it is possible to identify an output signal indicating the abnormal value. For example, the first ECU 31 and the second ECU 32 calculate the difference between the output signals of the first to fourth sensors 21 to 24. When the difference (that is, an inspection value) is greater than 0 or a predetermined threshold, the first ECU 31 and the second ECU 32 identify the output signal indicating an abnormality. The first ECU 31 and the second ECU 32 detect the operation amount of the brake pedal 12 based on a plurality of normal output signals excluding the output signal indicating the abnormal value, and drive and control the brake circuit 40.

As the brake circuit 40, for example, a configuration can be adopted in which the hydraulic pressure of the brake fluid is increased by operating a hydraulic pump (not shown) to drive the wheel cylinders 41 to 44 attached to each wheel. The wheel cylinders 41 to 44 arranged on the respective wheels drive the brake pads provided on the respective wheels. Brake pads come into frictional contact with corresponding brake discs, and the vehicle slows down as each wheel is braked.

In addition, the brake circuit 40 can also perform normal control, ABS control, VSC control, etc. according to control signals from the first ECU 31 and the second ECU 32. ABS stands for Anti-lock Braking System, and VSC stands for Vehicle Stability Control.

The brake circuit 40 is not limited to the one that generates hydraulic pressure in the brake fluid flowing through the brake circuit 40 by driving the hydraulic pump as described above, and may be configured to drive the brake pads by an electric actuator, for example.

Next, the brake pedal device 10 will be described with reference to FIGS. 2 and 3. The coordinates described in FIGS. 2 and 3 indicate a vertical direction, a front-rear direction, and a left-right direction when the brake pedal device 10 is mounted on the vehicle.

Figure 2:
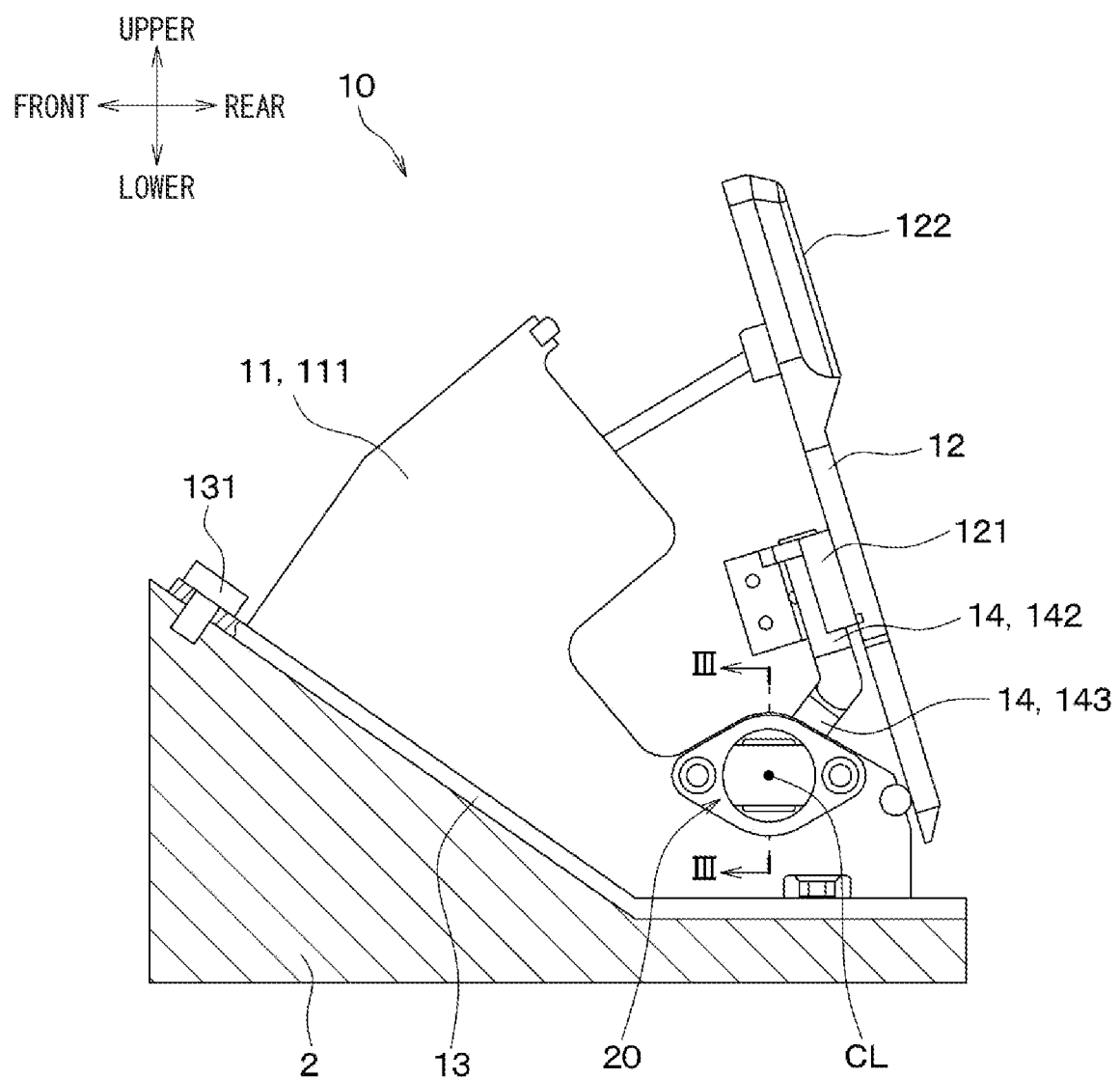
FIG. 2 is a side view of a brake pedal device of the brake system according to the first embodiment.
Figure 3:
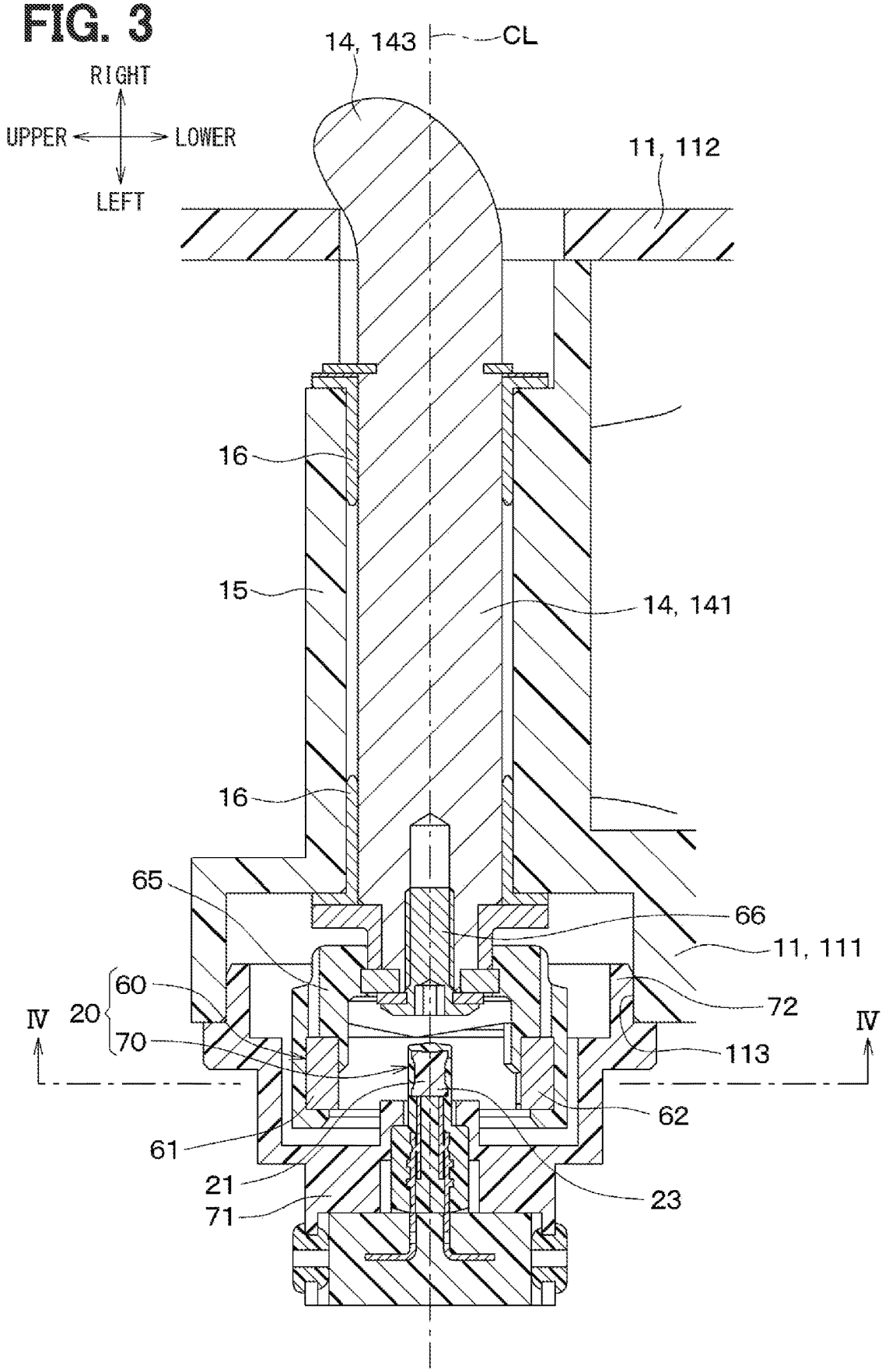
FIG. 3 is a cross-sectional view taken along a line III-III of FIG. 2.

As shown in FIGS. 2 and 3, the brake pedal device 10 includes the housing 11, a base plate 13, a shaft 14, a brake pedal 12, the position detection device 20, and the like. The housing 11 and the base plate 13 correspond to an example of a "fixed body fixed to the vehicle".

The housing 11 is a member that holds or covers the shaft 14, the position detection device 20, a reaction force generation mechanism (not shown), and the like. The housing 11 has a housing body 111 and a housing cover 112. A space for arranging the position detection device 20 and the reaction force generation mechanism is provided inside the housing body 111. Further, the housing body 111 is provided with a shaft receiving portion 15 for rotatably supporting the shaft 14. The housing cover 112 is provided on a side surface of the housing body 111 and closes the side opening of the space formed inside the housing body 111.

The base plate 13 extends continuously from a portion of the housing 11 on the front side of the vehicle to a portion on the rear side of the vehicle. The base plate 13 is made of a material having a higher strength than the housing 11, such as metal. The base plate 13 is fixed to a floor 2 or dash panel of the vehicle by bolts 131 or the like. The housing 11 is fixed to the base plate 13. That is, the housing 11 is fixed to the vehicle body via the base plate 13. The base plate 13 has the function of increasing the rigidity of the housing 11.

As shown in FIG. 3, the shaft 14 is rotatably or oscillatably supported by a shaft receiving portion 15 provided on the housing body 111. Specifically, a cylindrical bearing 16 for supporting the shaft 14 is attached to the shaft receiving portion 15 provided in the housing body 111, and the shaft 14 is supported by the bearing 16. Therefore, the shaft 14 can oscillate around the center of the shaft receiving portion 15 (that is, the center of the bearing 16) as an axis CL.

As shown in FIGS. 2 and 3, the shaft 14 is formed by bending a columnar metal, for example, multiple times, and has a shaft portion 141, a fixing portion 142 and a connecting portion 143. The shaft portion 141 is a portion that extends parallel to a center line of the shaft receiving portion 15 (that is, the axis CL of the shaft 14) and is arranged in the shaft receiving portion 15. The fixing portion 142 is a portion fixed to the brake pedal 12. The fixing portion 142 is fixed to a fixing metal fitting 121 provided on the surface of the brake pedal 12 opposite to the surface that receives the pedaling force from the driver (hereinafter referred to as "rear surface of the brake pedal 12"). The connecting portion 143 is a portion that connects the shaft portion 141 and the fixing portion 142. Since the shaft 14 has the shaft portion 141, the fixing portion 142, and the connecting portion 143, the axis CL of the shaft 14 and the brake pedal 12 are arranged at a position separated from each other, and the position detection device 20 can be easily provided in the area around the axis CL.

The brake pedal 12 is made of, for example, metal or resin in a plate shape, and is arranged obliquely with respect to the floor 2. Specifically, the brake pedal 12 is obliquely arranged so that the upper end thereof faces the front of the vehicle and the lower end thereof faces the rear of the vehicle. A thick portion 122 is provided on the upper portion of the brake pedal 12 as a portion to be stepped on by the driver. The thick portion 122 is arranged above the axis CL in the vertical direction when mounted on the vehicle.

As described above, the rear surface of the brake pedal 12 and the fixing portion 142 of the shaft 14 are fixed by the fixing metal fitting 121. Therefore, the brake pedal 12 oscillates around the same axis CL as the shaft 14. That is, the axial center CL of the brake pedal 12 and the axial center CL of the shaft 14 are the same. The brake pedal 12 oscillates about the axis CL in the forward and reverse directions within a predetermined angular range in response to an increase or decrease in the pedaling force of the driver.

Although not shown, the reaction force generating mechanism is provided in the housing 11 for generating a reaction force against the force applied to the brake pedal 12 by the driver. The reaction force generating mechanism can be composed of one or more elastic members, actuators, or the like. The brake pedal 12 of the present embodiment is configured so as not to be mechanically connected to the master cylinder provided in the brake circuit 40. Even in this configuration, the brake pedal device 10 is provided with the reaction force generating mechanism. Therefore, the brake pedal device 10 can obtain the same reaction force as when the brake pedal 12 and the master cylinder are mechanically connected (that is, when the reaction force due to the hydraulic pressure of the master cylinder is obtained).

The brake pedal device 10 of the present embodiment has a configuration in which the brake pedal 12 and the shaft 14 oscillate about the same axis CL. Therefore, the oscillating angle of the brake pedal 12 depressed by the driver to control the running of the vehicle is the same as the oscillating angle of the shaft 14. The oscillating angles of the brake pedal 12 and the shaft 14 are directly detected by the position detection device 20 provided on and around the axis CL of the shaft 14.

Figure 4:
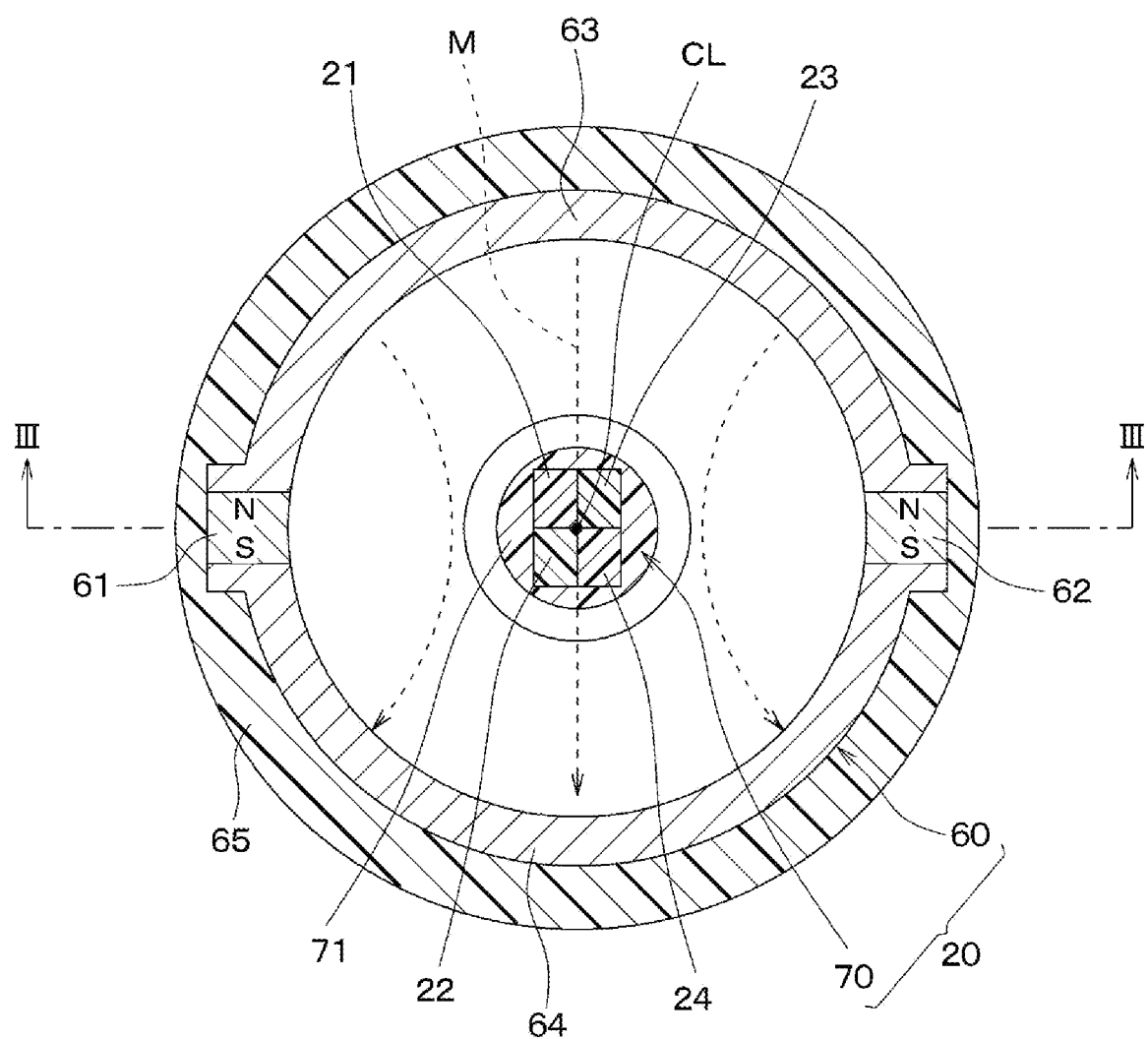
FIG. 4 is a cross-sectional view of a position detection device taken along a line IV-IV of FIG. 3.

As shown in FIGS. 3 and 4, the position detection device 20 of the present embodiment is configured as a magnet-type rotation angle sensor that includes a cylindrical magnetic circuit portion 60 fixed to an end of the shaft 14, and a magnetic detection portion 70 provided radially inside the cylindrical magnetic circuit portion 60.

The magnetic circuit portion 60 is formed in a cylindrical shape by two permanent magnets 61 and 62 and two arcuate yokes 63 and 64 and is provided around the axis CL of the shaft 14. The magnetic circuit portion 60 constitutes a closed magnetic circuit. The closed magnetic circuit is a circuit in which the permanent magnets 61 and 62 and the yokes 63 and 64 are in contact with each other and a loop through which the magnetic flux flows is closed.

The two permanent magnets 61 and 62 are arranged on one side and the other side in the radial direction with respect to the axis CL. In the following description, of the two permanent magnets 61 and 62, a magnet arranged on one side in the radial direction with respect to the axis CL is called the first magnet 61, and a magnet arranged on the other side in the radial direction with respect to the axis CL is called the second magnet 62. Also, one of the two yokes 63 and 64 is called a first yoke 63 and the other yoke is called a second yoke 64.

The first yoke 63 has one end in the circumferential direction connected to the N pole of the first magnet 61 and the other end in the circumferential direction connected to the N pole of the second magnet 62. The second yoke 64 has one end in the circumferential direction connected to the S pole of the first magnet 61 and the other end in the circumferential direction connected to the S pole of the second magnet 62. Therefore, as indicated by the dashed arrow M in FIG. 4, in a radially inner region of the magnetic circuit portion 60, a magnetic field is formed by magnetic flux in a direction crossing the axis CL from the first yoke 63 toward the second yoke 64.

The magnetic circuit portion 60 is insert-molded inside a resin portion 65. The resin portion 65 is fixed to one end of the shaft 14 with a bolt 66 or the like. In this state, the center of the magnetic circuit portion 60 and the axis CL of the shaft 14 are aligned. The magnetic circuit portion 60 oscillates together with the shaft 14 around the axis CL of the shaft 14. When the magnetic circuit portion 60 oscillates around the axis CL together with the shaft 14, a direction of the magnetic field formed in the radially inner region of the magnetic circuit portion 60 changes. A magnetic detection portion 70 is provided in a radially inner region of the magnetic circuit portion 60.

The magnetic detection portion 70 is composed of the first to fourth sensors 21 to 24, and is integrally provided in the resin that constitutes a sensor holding portion 71 by insert molding. The sensor holding portion 71 is fixed to the housing body 111. Therefore, like the housing 11 and the base plate 13, the sensor holding portion 71 also corresponds to an example of a "fixed body fixed to the vehicle." Positioning of the sensor holding portion 71 and the housing 11 is performed by fitting a protrusion 72 provided on an outer peripheral edge of the sensor holding portion 71 into an inner wall surface 113 of an opening provided in the housing 11. In this state, it is possible to prevent a positional deviation between the magnetic detection portion 70 provided in the sensor holding portion 71 and the axis CL of the shaft 14.

The first to fourth sensors 21 to 24 constituting the magnetic detection portion 70 each is a magnetoresistive element (hereinafter referred to as "MR element") or four rotation angle sensors having a Hall element, that outputs a signal according to the magnetic field of the magnetic circuit portion 60. The MR element is an element whose electrical resistance value changes depending on the angle of the magnetic field in the horizontal direction with respect to the magnetically sensitive surface. The Hall element is an element that outputs a Hall voltage depending on a strength of a magnetic field perpendicular to a magnetically sensitive surface.

When the driver depresses the brake pedal 12, the brake pedal 12, the shaft 14, and the magnetic circuit portion 60 all oscillate around the axis CL. The first to fourth sensors 21 to 24 constituting the magnetic detection portion 70 output signals corresponding to the oscillating angle of the magnetic circuit portion 60. The oscillating angle of the magnetic circuit portion 60 is the same as the oscillating angles of the brake pedal 12 and the shaft 14. Therefore, the first to fourth sensors 21 to 24 each output a signal corresponding to the angle at which the brake pedal 12 and the shaft 14 oscillate around the predetermined axis CL, as the operation amount of the brake pedal 12.

Figure 5:
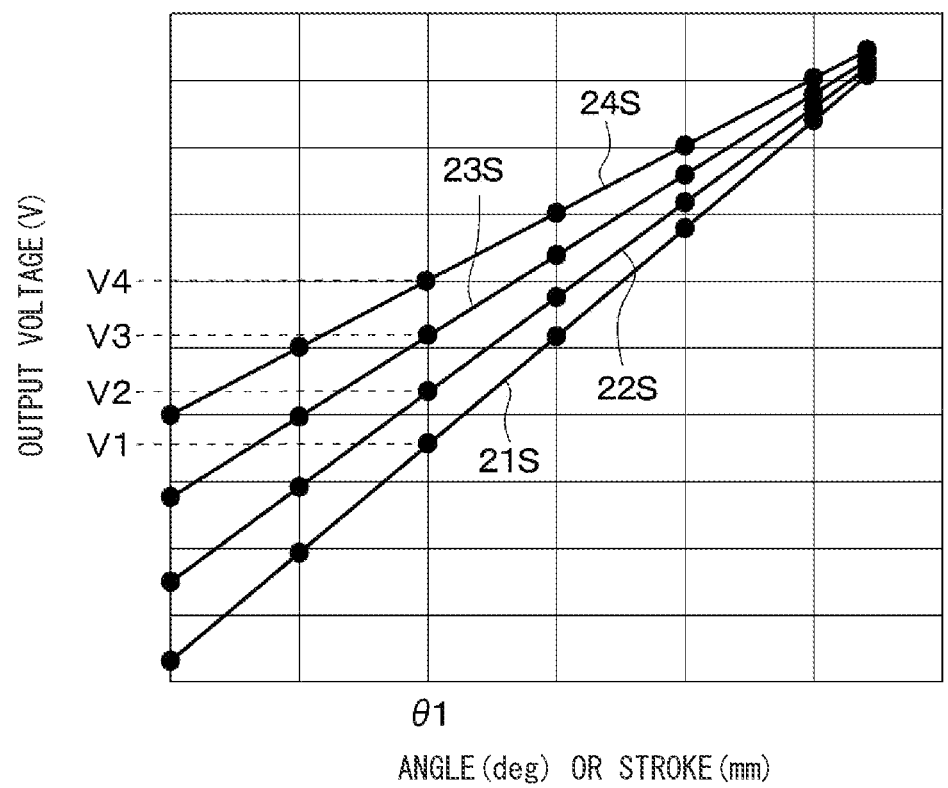
FIG. 5 is a characteristic diagram of output signals of first to fourth sensors.

FIG. 5 is a graph showing the characteristics of the output signals of the first to fourth sensors 21 to 24 at a predetermined environmental temperature. A horizontal axis of the graph in FIG. 5 indicates the magnitude of the operation amount (specifically, the angle or stroke) of the brake pedal 12, and a vertical axis indicates the output signals (specifically, the output voltage) of the first to fourth sensors 21 to 24. In the graph of FIG. 5, lines indicating the output characteristics of the first to fourth sensors 21 to 24 are labeled with signs 21S to 24S.

As shown in the graph of FIG. 5, the first to fourth sensors 21 to 24 have different rates of change in output voltage according to changes in the operation amount of the brake pedal 12. On the other hand, the first ECU 31 and the second ECU 32 to which the output signals of the first to fourth sensors 21 to 24 are inputted store a relationship between the operation amount of the brake pedal and the output signals of the first to fourth sensors 21 to 24. For example, as shown in FIG. 5, regarding the brake pedal operation amount θ1, information such as that the output signal of the first sensor 21 is V1, the output signal of the second sensor 22 is V2, the output signal of the third sensor 23 is V3, and the output signal of the fourth sensor 24 is V4 is stored. That is, the brake pedal operation amount corresponds to the output value of each sensor signal.

Various methods can be considered for identifying an output signal indicating an abnormal value.

For example, a value is calculated by comparing the two output differences of the first to fourth sensors 21 to 24, then normality and abnormality can be detected based on a threshold value as a reference. The correct sensor signal determination is possible even if the sensor signal fluctuates due to disturbance. Brake control can then be performed using correct sensor signals.

Specifically, when comparing the output of the first sensor 21 and the output of the second sensor 22, using a following Equation 1, when the value of Equation 1 is 0 or greater than a predetermined threshold in the image of overlapping the line 21S and the line 22S in the graph of FIG. 5, it is determined as abnormal.

(an output voltage of the first sensor−an intercept of the first sensor)−a slope of the first sensor/a slope of the second sensor (an output voltage of the second sensor−an intercept of the second sensor) [Equation 1]

The same concept as above is used when calculating the value obtained by comparing the two output differences of two sensors other than the first and second sensors 21 and 22 for the first to fourth sensors 21 to 24.

Alternatively, as another method, for example, the first ECU 31 and the second ECU 32 store the relationship between the output signals of the first to fourth sensors 21 to 24 and the operation amount of the brake pedal, as described above. Based on the information regarding the relationship, the first ECU 31 and the second ECU 32 derive four brake pedal operation amounts corresponding to the output signals of the first to fourth sensors 21 to 24, respectively. Then, among the operation amounts of the four brake pedals, an output signal indicating an operation amount that is different from the same operation amount derived most frequently is specified as an output signal having an abnormal value. As a result, it is possible to specify up to two output signals having the abnormal values for the signals from the four sensors 21 to 24 by majority decision.

The first ECU 31 and the second ECU 32 identify the output signal indicating the above-mentioned abnormal value, and then detect the operation amount of the brake pedal 12 based on a plurality of normal output signals excluding the output signal having the abnormal value, and drive and control the brake circuit 40 so as to perform braking of the vehicle.

The brake system 1 of the first embodiment described above has the following effects.

(1) In the first embodiment, the output signals of the first sensor 21 and the second sensor 22 of the position detection device 20 are transmitted from the first ECU 31 to the second ECU 32 via the signal transmission unit 33 in a distinguishable manner. Moreover, the output signals of the third sensor 23 and the fourth sensor 24 are transmitted from the second ECU 32 to the first ECU 31 via the signal transmission unit 33 in a distinguishable manner. Thereby, the first ECU 31 and the second ECU 32 acquire the output signals of the first to fourth sensors 21 to 24 in a distinguishable manner. Therefore, the first ECU 31 and the second ECU 32 can identify an output signal indicating an abnormal value by comparing the output signals of the first to fourth sensors 21 to 24. Therefore, the first ECU 31 and the second ECU 32 can detect an accurate operation amount based on a plurality of normal output signals excluding the output signal having the abnormal value, and drive and control the brake circuit 40. As a result, this brake system 1 can improve the safety of braking control of the vehicle against failures of the first to fourth sensors 21 to 24.

Further, when the output signals of at least two sensors out of the output signals of the first to fourth sensors 21 to 24 indicate the same operation amount, the first ECU 31 and the second ECU 32 can identify the output signals of two sensors indicating different operation amount as an output signal indicating an outlier. Therefore, even if multiple sensors fail, the brake system 1 can accurately detect the operation amount of the brake pedal 12 based on multiple normal output signals, excluding abnormal values, and drive and control the brake circuit 40.

(2) In the first embodiment, the first sensor 21 and the first ECU 31 are connected by the first signal line 51. The second sensor 22 and the first ECU 31 are connected by the second signal line 52. The third sensor 23 and the second ECU 32 are connected by the third signal line 53. The fourth sensor 24 and the second ECU 32 are connected by the fourth signal line 54.

According to this configuration, by connecting the plurality of ECUs and the plurality of sensors 21 to 24 by wire, it is possible to stably transmit information between the plurality of ECUs and the plurality of sensors 21 to 24.

(3) In the first embodiment, the first ECU 31 and the second ECU 32 identify the following output signals as output signals indicating an abnormal value. The first ECU 31 and the second ECU 32 specify the output signal, which indicates the operation amount that is different from the plurality of output signals that indicate the same operation amount that is derived the most among a plurality of operation amounts derived from the output signals of the first to fourth sensors 21 to 24, as an output signal indicating an abnormal value.

According to this configuration, it is possible to identify a plurality of output signals, which indicates the same operation amount that is derived the most among a plurality of operation amounts derived from the output signals of the first to fourth sensors 21 to 24, as correct output signals and an output signal indicating an abnormal value.

(4) In the first embodiment, the first to fourth sensors 21 to 24 of the position detection device 20 all are the rotation angle sensors that output the signal according to the angle at which the brake pedal 12 oscillates around the predetermined axis CL as the operation amount of the brake pedal 12.

According to this configuration, by providing four rotation angle sensors around the axis CL of the brake pedal 12, the configuration can be simplified, and the number of parts, assembly man-hours, and cost can be reduced.

(5) In the first embodiment, the position detection device 20 is a magnet-type rotation angle sensor having one magnetic circuit portion 60 that forms a magnetic field, and the magnetic detection portion 70 as four rotation angle sensors that detect the magnetic field of the magnetic circuit section 60.

According to this configuration, it is possible to use a common magnetic circuit portion 60 (that is, one magnetic circuit section 60) that generates the magnetic field detected by the magnetic detection portion 70 (for example, a Hall element or an MR element). Therefore, the size of the magnet-type rotation angle sensor having four rotation angle sensors can be reduced in size, and the number of parts, assembly man-hours, and cost can be reduced.

(6) The brake system 1 of the first embodiment is configured as a complete brake-by-wire system in which the components of the brake circuit 40 and the brake pedal 12 are not mechanically connected.

According to this configuration, in the complete brake-by-wire system, the safety of braking control of the vehicle can be improved against failures of the first to fourth sensors 21 to 24.

Second Embodiment

A second embodiment will be described. In the second embodiment, the configuration of the position detection device 20 is changed from that of the first embodiment, and the remaining configurations are the same as those of the first embodiment, and therefore, only portions different from the first embodiment will be described.

Figure 6:
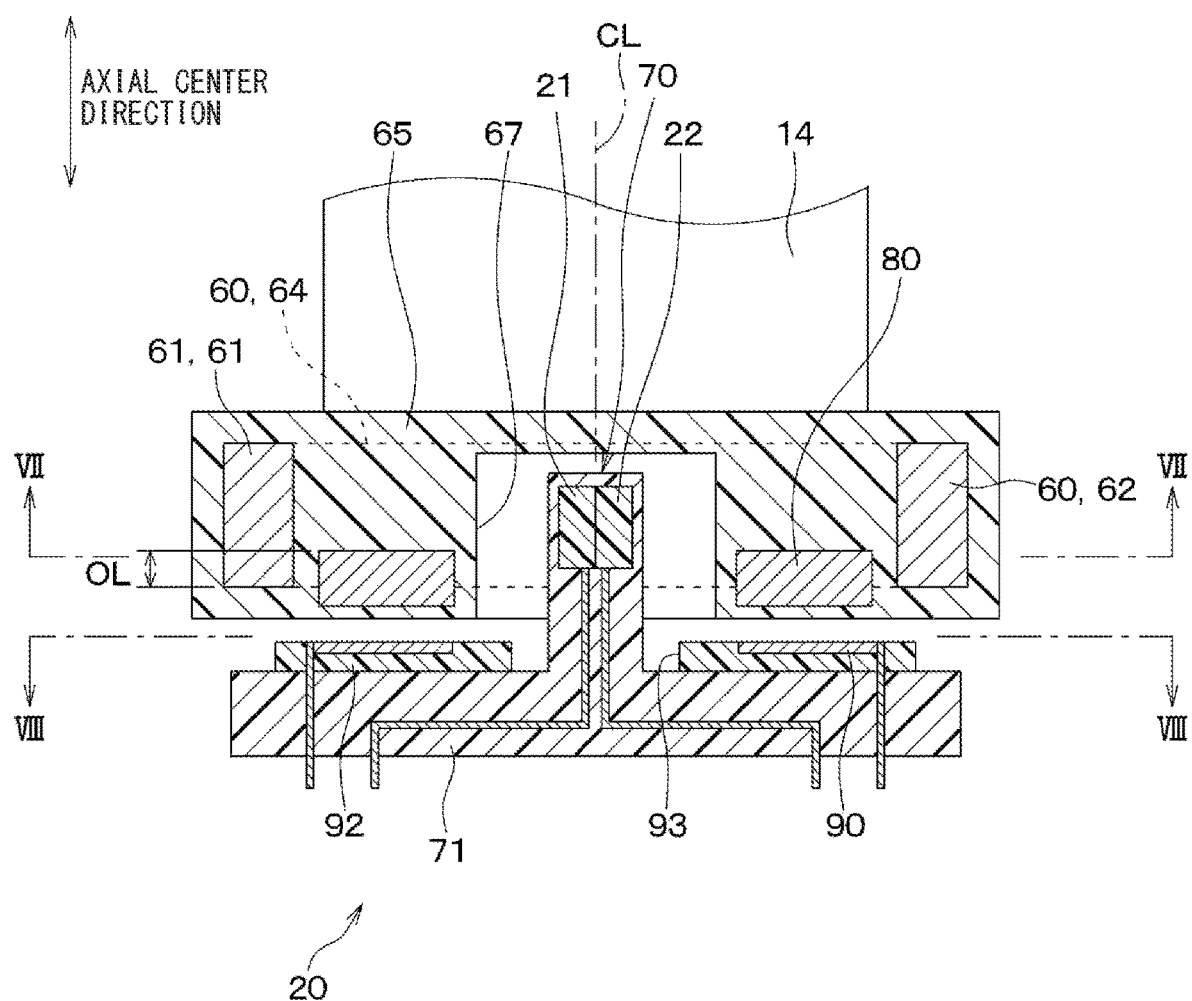
FIG. 6 is a cross-sectional view of a position detection device included in a brake pedal device in a brake system according to a second embodiment.
Figure 7:
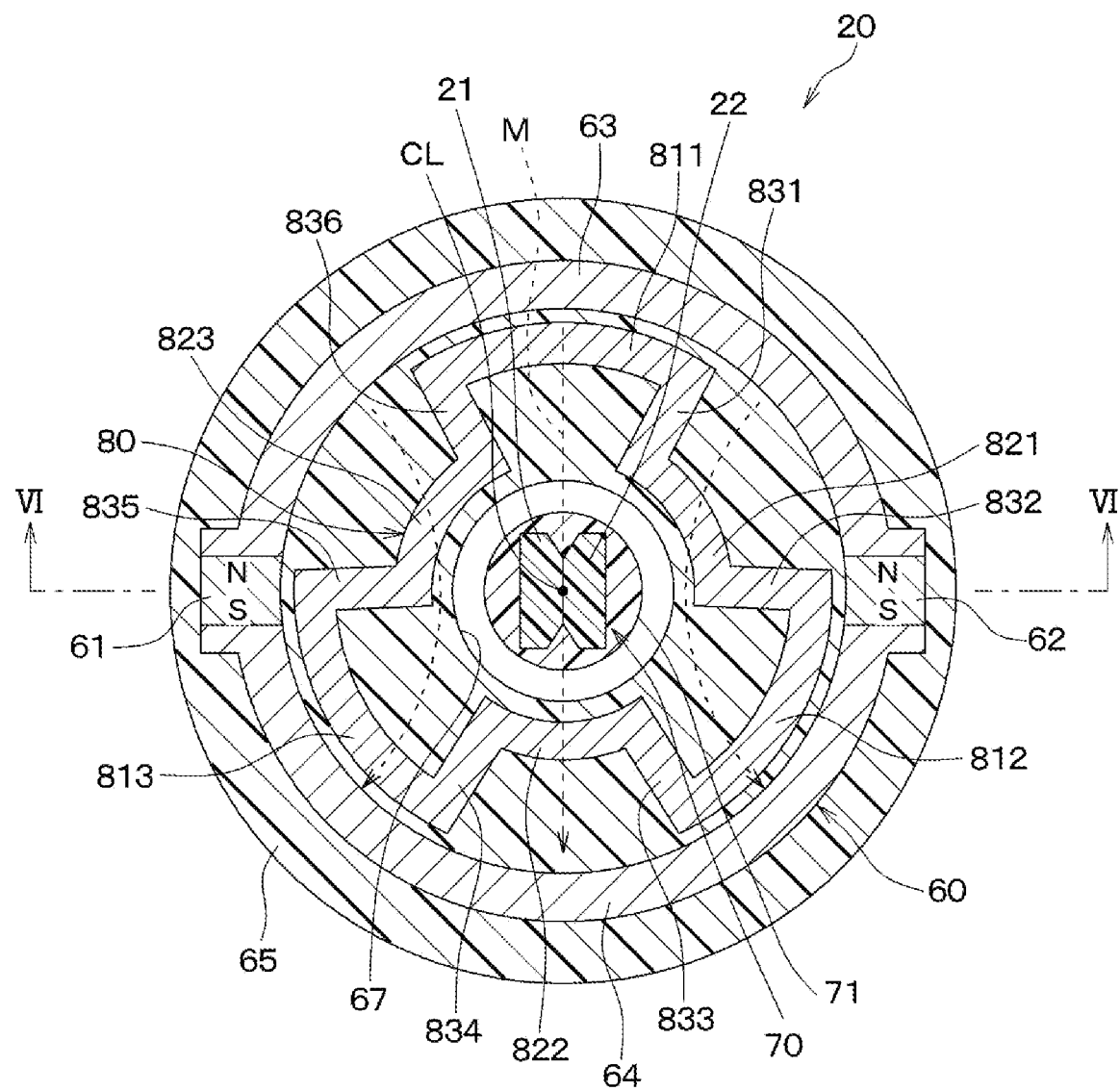
FIG. 7 is a cross-sectional view taken along a line VII-VII in FIG. 6.
Figure 8:
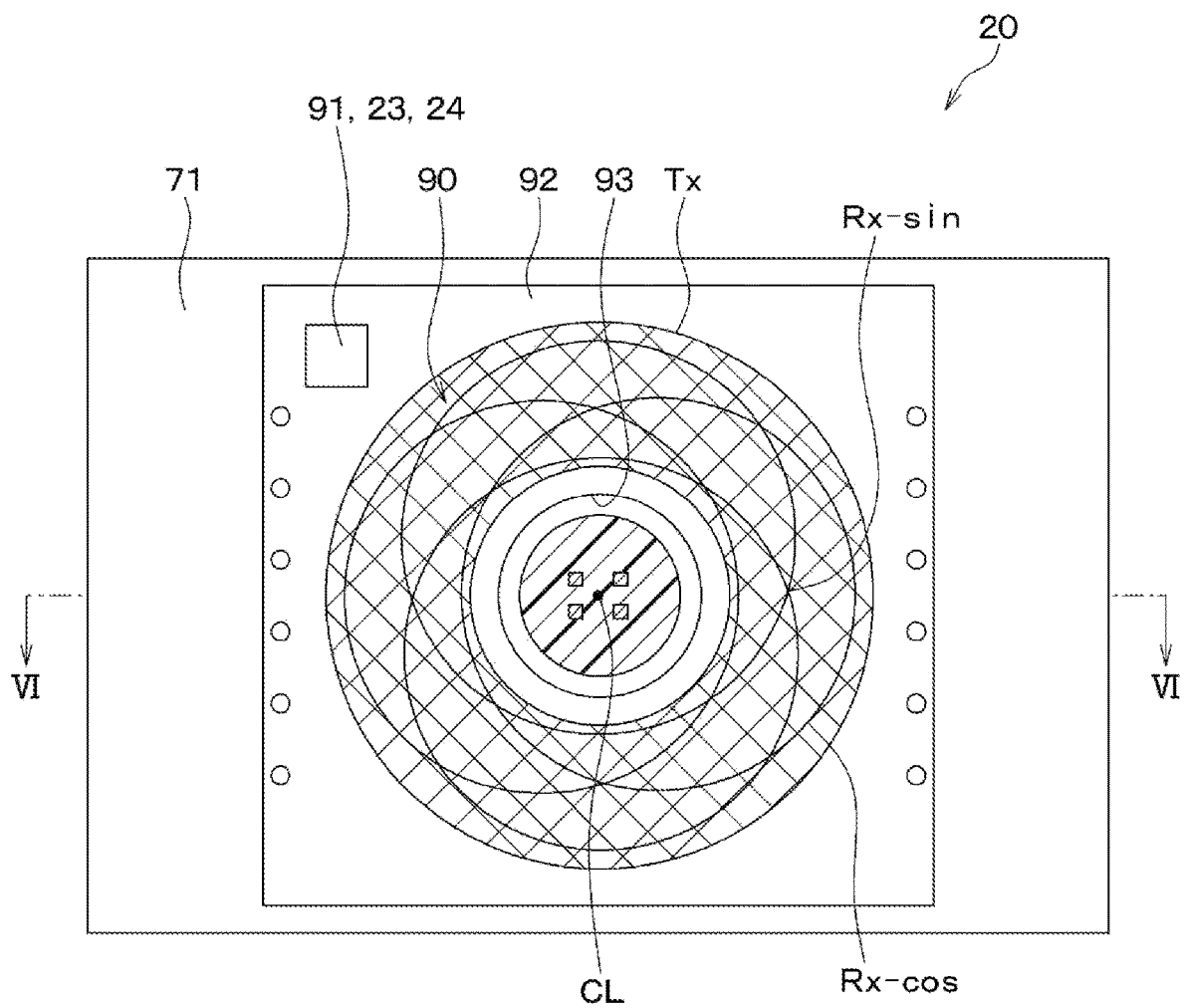
FIG. 8 is a cross-sectional view taken along a line VIII-VIII in FIG. 6.

As shown in FIGS. 6 to 8, the position detection device 20 of the second embodiment includes a magnet-type rotation angle sensor having a magnetic circuit portion 60 and a magnetic detection portion 70, a target 80, an inductive sensor having a coil 90 and a receiving/transmitting circuit 91.

In the second embodiment, a magnetic detection portion 70 included in the magnet-type rotation angle sensor includes a first sensor 21 and a second sensor 22. That is, the first sensor 21 and the second sensor 22 are both rotation angle sensors, and output a signal corresponding to the angle at which the brake pedal 12 oscillates around a predetermined axis CL as the operation amount of the brake pedal 12.

Further, in the second embodiment, the receiving/transmitting circuit 91 included in the inductive sensor is configured by a third sensor 23 and a fourth sensor 24. That is, the third sensor 23 and the fourth sensor 24 are both stroke sensors, and output a signal corresponding to the movement distance of the brake pedal 12 or a member that moves together with the brake pedal 12 as the operation amount of the brake pedal 12.

Hereinafter, specific examples of the magnet type rotation angle sensor and the inductive sensor will be described.

The magnetic circuit portion 60 of the magnet-type rotation angle sensor constitutes a closed magnetic circuit by two permanent magnets 61 and 62 and two arcuate yokes 63 and 64, as in the first embodiment. The magnetic detection portion 70 is provided in a radially inner region of the magnetic circuit portion 60.

The first sensor 21 and the second sensor 22 that constitute the magnetic detection portion 70 are integrally provided in the resin that constitutes the sensor holding portion 71 by insert molding. Both the first sensor 21 and the second sensor 22 are two rotation angle sensors having an MR element, a Hall element, or the like that outputs a signal according to the magnetic field of the magnetic circuit portion 60.

The target 80 constituting the inductive sensor is arranged in a region radially inward from the inner circumferential surface of the cylindrical magnetic circuit portion 60. Thereby, the size of the position detection device 20 in the radial direction can be reduced in size. The region radially inward from the inner circumferential surface of the magnetic circuit portion 60 is a range that also includes a position shifted in an axial center direction with respect to the magnetic circuit portion 60. As shown in FIG. 6, in the second embodiment, the target 80 and the magnetic circuit portion 60 are provided so that at least a part of the target 80 and a part of the magnetic circuit portion 60 overlap in the radial direction when viewed from the radial direction of the magnetic circuit portion 60. In FIG. 6, when viewed from the radial direction of the magnetic circuit portion 60, the range where the target 80 and the magnetic circuit section 60 overlap in the radial direction is indicated by a double arrow OL. Thereby, the physique of the position detection device 20 in the axial center direction can be reduced in size. The position detection device 20 is not limited to the configuration shown in FIG. 6, and the target 80 and the magnetic circuit section 60 may not overlap in the radial direction.

The target 80 is made of a conductor such as metal, and is provided around the axis CL. As shown in FIG. 7, the target 80 includes, for example, three outer arc parts 811 to 813, three inner arc parts 821 to 823, and six connection parts 831 to 836 for connecting the outer arc parts 811 to 813 and the inner arc parts 821 to 823. The three outer arc parts 811 to 813 are arranged at approximately equal intervals in the circumferential direction. The three inner arc parts 821 to 823 are arranged radially inner than the outer circular arc parts 811 to 813 and at approximately equal intervals in the circumferential direction. The outer circular arc parts 811 to 813 and the inner circular arc parts 821 to 823 that are adjacent to each other in the circumferential direction are located at positions that are shifted in the circumferential direction (that is, positions where the outer arc parts 811 to 813 and the inner arc parts 821 to 823 do not overlap in the radial direction except for the circumferential ends) The six connection parts 831 to 836 extend in the radial direction and connect the circumferential ends of the outer circular arc parts 811 to 813 and the circumferential ends of the inner circular arc parts 821 to 823.

The shape, size, etc. of the target 80 are not limited to the configuration shown in FIG. 7, and can be set arbitrarily.

The target 80 and the magnetic circuit portion 60 are insert-molded inside the resin portion 65. As a result, the magnetic circuit portion 60 and the target 80 are formed into a sub-assembly, and misalignment between the magnetic circuit portion 60 and the target 80 is prevented. A recess 67 is provided in the center of the resin portion 65 and is recessed from the sensor holding portion 71 side toward the shaft 14 side. The magnetic detection portion 70 (namely, the first sensor 21 and the second sensor 22) that constitutes a part of the magnet-type rotation angle sensor is provided inside the recess 67.

The resin portion 65 is fixed to one end of the shaft 14. That is, the magnetic circuit portion 60 and the target 80 formed into a sub-assembly are fixed to one end of the shaft 14 via the resin portion 65. In this state, the center of the magnetic circuit portion 60, the center of the target 80, and the axis CL of the shaft 14 are aligned. The magnetic circuit portion 60 and the target 80 oscillate together with the shaft 14 around the axis CL of the shaft 14.

On the other hand, the magnetic detection portion 70 that forms part of a magnet-type rotation angle sensor and a circuit board 92 on which a coil 90 and a receiving/transmitting circuit 91 that form part of the inductive sensor are mounted are fixed to the sensor holding portion 71. That is, the coil 90 and the receiving/transmitting circuit 91 are fixed to the sensor holding portion 71 while being mounted on the circuit board 92.

The circuit board 92 is fixed to the surface of the sensor holding portion 71 facing the magnetic circuit portion 60 side. A hole 93 through which the magnetic detection portion 70 is inserted is provided in the center of the circuit board 92. The magnetic detection portion 70 passes through the hole 93 of the circuit board 92 and is provided in the radially inner region of the magnetic circuit portion 60 (specifically, the inner region of the recess 67 of the resin portion 65).

As shown in FIG. 8, the coil 90 and the receiving/transmitting circuit 91 are mounted on the circuit board 92. The coil 90 is provided at a position facing the target 80 in the axial center direction. In FIG. 8, the area where the coil 90 is mounted on the circuit board 92 is shown by a cross hatching. Further, although FIG. 8 shows an example of the shape of the coil 90 mounted on the circuit board 92, the shape of the coil 90 is not limited to this configuration, and various shapes may be adopted. The shape of the coil 90 is, for example, is a sine curve on the assumption that the circumferential direction is the horizontal axis. The coil 90 includes one pattern of transmitting coil Tx and two patterns of receiving coils Rx-sin and Rx-cos.

The third sensor 23 and the fourth sensor 24 that constitute the receiving/transmitting circuit 91 are incorporated into an integrated circuit (ie, an IC) mounted on the circuit board 92. The receiving/transmitting circuit 91 applies an alternating current to the coil 90 and detects the position of the target 80 based on a change in the inductance of the coil

90 using the physical principle of eddy current generated in the target 80 moving on a coil pattern. That is, the third sensor 23 and the fourth sensor 24 that constitute the receiving/transmitting circuit 91 can be said to be a stroke sensor that detects the moving distance of the target 80.

The second embodiment has a configuration such that two outputs are obtained from the receiving/transmitting circuit 91 (that is, the third sensor 23 and the fourth sensor 24). Specifically, for example, it is possible to adopt a configuration in which two outputs are obtained by one pattern of the transmission coil Tx, two patterns of the receiving coil Rx-sin, Rx-cos (that is, one pattern for Rx-sin and another pattern for Rx-cos), and the receiving/transmitting circuit 91. The receiving/transmitting circuit 91 includes the third sensor 23 and the fourth sensor 24. In this case, two signals Tx1 and Tx2 are applied to one pattern of transmitting coil Tx, and a single transmitter in the receiving/transmitting circuit 91 can make the transmission.

Alternatively, it is also possible to adopt a configuration in which two outputs are obtained by two patterns of the transmission coil Tx, two patterns of the receiving coil Rx-sin, Rx-cos (that is, one pattern for Rx-sin and another pattern for Rx-cos), and the receiving/transmitting circuit 91. Similarly to the above, the receiving/transmitting circuit 91 is configured to include the third sensor 23 and the fourth sensor 24. In this case, two signals Tx1 and Tx2 are applied to each of the two patterns of transmitting coils Tx, and the two transmitters in the receiving/transmitting circuit 91 can make the transmission.

The receiving/transmitting circuit 91 (that is, the third sensor 23 and the fourth sensor 24) may be provided in one package or may be provided in two packages.

The brake system 1 of the second embodiment described above provides the following effects in addition to the effects of the brake system 1 described in the first embodiment.

(1) In the second embodiment, the first sensor 21 and second sensor 22 of the position detection device 20 are the rotation angle sensors, and the third sensor 23 and fourth sensor 24 are the stroke sensors.

According to this configuration, by using different types of sensors for the first to fourth sensors 21 to 24, it is possible to prevent the four sensors 21 to 24 from simultaneously failing due to a predetermined disturbance factor.

By the way, for example, a force sensor may be used to detect the operation amount of the brake pedal 12 instead of the rotation angle sensor or the stroke sensor. However, when a force sensor is used to detect the operation amount of the brake pedal 12, the following problems (A), (B), and (C) occur.

(A) Generally, the force sensor has a dead zone, so there is a problem that a rise accuracy of the output signal of the force sensor is insufficient.

(B) While the output voltage of the rotation angle sensor fluctuates linearly in response to changes in the operation amount of the brake pedal 12, a hysteresis characteristic occurs in the output of the force sensor. That is, the force sensor has a problem in that there is a difference between the output value when the operation amount of the brake pedal 12 changes from small to large and the output value when the operation amount of the brake pedal 12 changes from large to small.

(C) According to the above problems (A) and (B), when the force sensor is used to detect the operation amount of the brake pedal 12, there is a problem that it becomes difficult to identify the signal indicating the abnormal value by comparing the output signals of the four force sensors.

On the other hand, the brake system 1 of the second embodiment uses the rotation angle sensor and the stroke sensor as the first to fourth sensors 21 to 24, so that the problems described in (A), (B), and (C) above do not occur. Therefore, in the present embodiment, by comparing the four output signals from the rotation angle sensor and the stroke sensor, it is possible to identify the output signal indicating an abnormal value.

(2) In the second embodiment, the position detection device 20 includes the magnet-type rotation angle sensor and the inductive sensor. The magnet-type rotation angle sensor includes one magnetic circuit portion 60 and the magnetic detection portions 70 as two rotation angle sensors (ie, the first sensor 21 and the second sensor 22). On the other hand, the inductive sensor includes one target 80, one coil 90 (i.e., a transmitting coil and a receiving coil), and the receiving/transmitting circuit 91 as two stroke sensors (i.e., the third sensor 23 and the fourth sensor 24). According to this configuration, the position detection device 20 has two types of sensors, and by arranging the two types of sensors in combination around the axis CL of the shaft 14. Therefore, it is possible to reduce the size in the radial direction and the size in the axial direction.

Third Embodiment

A third embodiment will be described. The third embodiment is similar to the first embodiment except for the configuration of the signal lines connecting the sensors 21 to 24 and the ECU modified from the corresponding configuration of the first embodiment. Accordingly, only parts different from the corresponding parts of the first embodiment are herein described.

Figure 9:
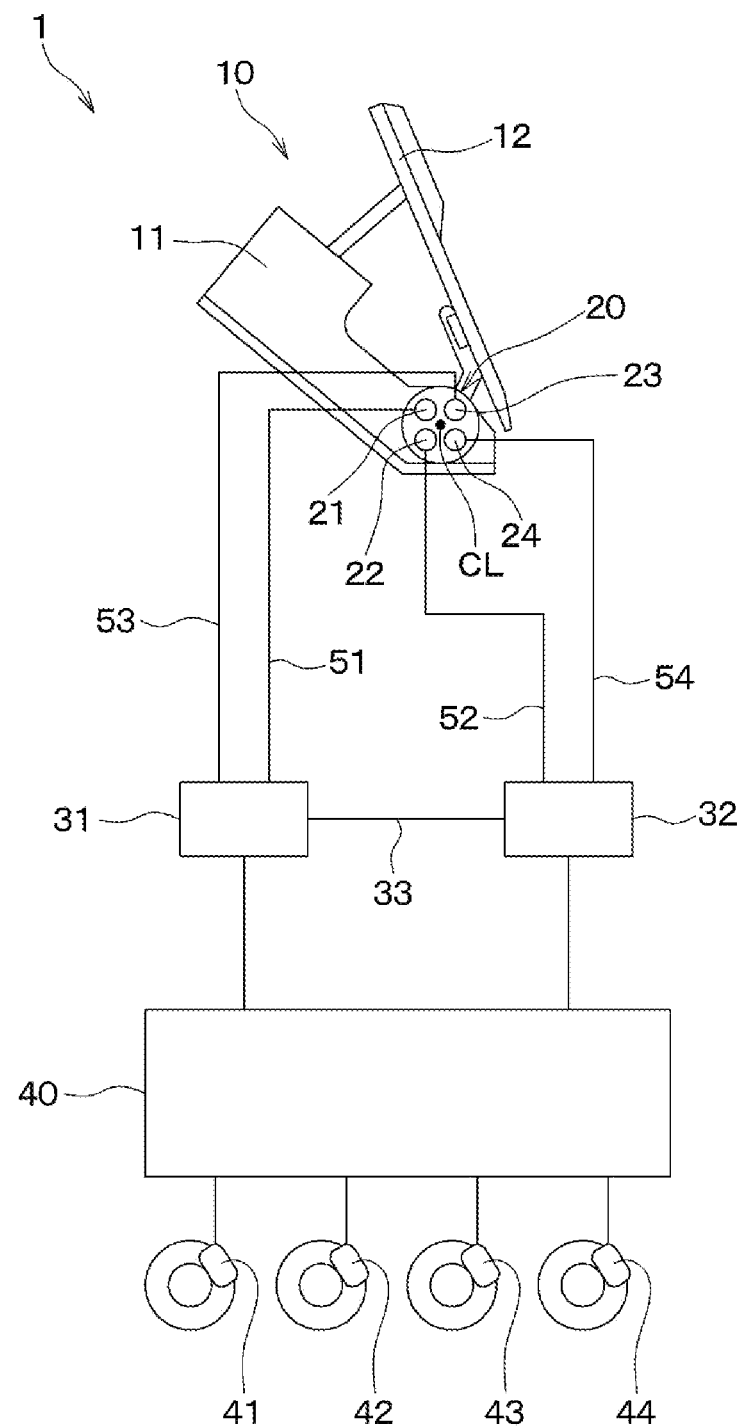
FIG. 9 is a diagram showing a schematic configuration of a brake system according to a third embodiment.

As shown in FIG. 9, also in the third embodiment, the position detection device 20 provided in the brake pedal device 10 includes the first to fourth sensors 21 to 24. The first to fourth sensors 21 to 24 may all be composed of rotation angle sensors as in the first embodiment, or may be composed of two rotation angle sensors and two stroke sensors as in the second embodiment.

In the third embodiment, the first sensor 21 and the first ECU 31 are electrically connected by the first signal line 51, and the third sensor 23 and the first ECU 31 are electrically connected by the third signal line 53. Therefore, the output signals of the first sensor 21 and the third sensor 23 are input to the first ECU 31 in a distinguishable manner.

Further, the second sensor 22 and the second ECU 32 are electrically connected by a second signal line 52, and the fourth sensor 24 and the second ECU 32 are electrically connected by a fourth signal line 54. Therefore, the output signals of the second sensor 22 and the fourth sensor 24 are input to the second ECU 32 in a distinguishable manner.

Also in the third embodiment, like the first and second embodiments, the first ECU 31 and the second ECU 32 are connected through the signal transmission unit 33 so that they can transmit information to each other. Therefore, the output signals of the first sensor 21 and the third sensor 23 input to the first ECU 31 are transmitted to the second ECU 32 via the signal transmission unit 33 in a distinguishable manner. Further, the output signals of the second sensor 22 and the fourth sensor 24 input to the second ECU 32 are transmitted to the first ECU 31 via the signal transmission unit 33 in a distinguishable manner. Therefore, both the first ECU 31 and the second ECU 32 can acquire the output signals of the first to fourth sensors 21 to 24 in a distinguishable manner.

The first ECU 31 and the second ECU 32 compare the output signals of the first to fourth sensors 21 to 24 when there is an output signal indicating an abnormal value among the output signals of the first to fourth sensors 21 to 24. By doing so, it is possible to identify an output signal indicating the abnormal value. The first ECU 31 and the second ECU 32 detect the operation amount of the brake pedal 12 based on a plurality of normal output signals excluding the output signal indicating the abnormal value, and drive and control the brake circuit 40. Therefore, the brake system 1 of the third embodiment described above also has the same effects as the brake system 1 described in the first and second embodiments.

Other Embodiments (1) In each of the above embodiments, the position detection device 20 has been described as having the first to fourth sensors 21 to 24, but the position detection device 20 is not limited to this configuration, and the position detection device 20 may have four or more sensors. In other words, the position detection device 20 may have at least four sensors.

(2) In the first to third embodiments described above, the output signals of two sensors are input to the first ECU 31, and the output signals of another two sensors are input to the second ECU 32. However, it is not limited to this configuration. Output signals from two or more sensors may be input to the first ECU 31, and output signals from two or more sensors may be input to the second ECU 32.

(3) In each of the above embodiments, the position detection device 20 has been described as being provided on and around the axis CL of the shaft 14, but the present disclosure is not limited to this configuration. The position detection device 20 may detect the amount of movement or oscillating angle of the brake pedal 12 or various members that operate together with the brake pedal 12 (for example, a reaction force generating mechanism and its attached members).

(4) In the second embodiment, the coil 90 and the target 80 constituting the inductive sensor are provided in a 360° range (that is, the entire circumference) around the axis CL, but the present disclosure is not limited to this configuration. For example, the coil 90 and the target 80 constituting the inductive sensor may be provided in a predetermined angular range (that is, a fan-shaped or circular arc-shaped range) smaller than 360°.

(5) In each of the above embodiments, the brake pedal device 10 is described as an organ-type brake pedal device, but the brake pedal device 10 is not limited to this configuration and may be a pendant-type brake pedal device. The pendant-type pedal device is a configuration in which the part of the brake pedal 12 that is stepped on by the driver is arranged below the pivot axis CL in the vertical direction when mounted on the vehicle.

(6) In each of the above embodiments, the brake system 1 has been described as a complete brake-by-wire system in which the components of the brake circuit 40 and the brake pedal 12 are not mechanically connected. It is not limited to this configuration and may also be a normal brake-by-wire system. The normal brake-by-wire system is a configuration in which the ECU drives and controls the brake circuit 40 based on the output signal of the position detection device 20, and the master cylinder of the brake circuit 40 and the brake pedal 12 are mechanically connected.

(7) In each of the above embodiments, the brake system 1 has been described as including the first ECU 31 and the second ECU 32, but the brake system 1 is not limited to this configuration, and may include three or more ECUs.

The present disclosure is not limited to the above-described embodiments, and can be appropriately modified. The above-described embodiments are not independent of each other, and can be appropriately combined together except when the combination is obviously impossible. The constituent element(s) of each of the above embodiments is/are not necessarily essential unless it is specifically stated that the constituent element(s) is/are essential in the above embodiment, or unless the constituent element(s) is/are obviously essential in principle. A quantity, a value, an amount, a range, or the like referred to in the description of the embodiments described above is not necessarily limited to such a specific value, amount, range or the like unless it is specifically described as essential or understood as being essential in principle. Further, in each of the above-mentioned embodiments, when referring to the shape, positional relationship, and the like of a component and the like, the component is not limited to the shape, positional relationship, and the like, except for the case where the component is specifically specified, the case where the component is fundamentally limited to a specific shape, positional relationship, and the like.

The control unit and the method thereof described in the present disclosure are realized by a dedicated computer provided by configuring a processor and a memory programmed to execute one or more functions embodied by a computer program. May be done. Alternatively, the controller and the method described in the present disclosure may be implemented by a special purpose computer configured as a processor with one or more special purpose hardware logic circuits. Alternatively, the controller and the method described in the present disclosure may be implemented by one or more special purpose computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium.

What is claimed is:

1. A brake system configured to drive and control a brake circuit that performs braking of a vehicle, the brake system comprising:
    a brake pedal device having a brake pedal that is oscillatably provided around a predetermined axis with respect to a fixed body fixed to the vehicle;
    a position detection device having at least four sensors that output signals according to an operation amount of the brake pedal depressed by a driver;
    a first electronic control unit into which output signals of at least two of the at least four sensors are input in a distinguishable manner;
    a second electronic control unit into which among the at least four sensors, output signals of at least two other sensors other than the sensor whose output signals are input to the first electronic control unit are input in a distinguishable manner; and
    a signal transmission unit configured to transmit the output signals of the at least two sensors input to one of the first electronic control unit and the second electronic control unit to the other of the first electronic control unit and the second electronic control unit in a distinguishable manner wherein
    the first electronic control unit and the second electronic control unit identify an output signal indicating an abnormal value based on the output signals of at least four of the sensors, detect an operation amount of the brake pedal based on the plurality of output signals excluding the abnormal value, and drive and control the brake circuit, and each of the at least four sensors included in the position detection device is a rotation angle sensor that outputs a signal corresponding to an angle at which the brake pedal oscillates around a predetermined axis as the operation amount of the brake pedal.

2. The brake system according to claim 1, further comprising:

a first signal line and a second signal line that electrically connect each of at least two of the four sensors to the first electronic control unit; and a third signal line and a fourth signal line that electrically connect each of at least two other sensors among the at least four sensors, excluding the sensor whose signal is input to the first electronic control unit, to the second electronic control unit.

3. The brake system according to claim 1, wherein the first electronic control unit and the second electronic control unit specify the output signal, which indicates the operation amount that is different from the plurality of output signals indicating the same operation amount derived the most among a plurality of operation amounts derived from the output signals of at least four sensors, as an output signal indicating the abnormal value.

4. The brake system according to claim 1, wherein the position detection device includes at least one magnetic circuit portion that forms a magnetic field in which magnetic flux travels in a direction intersecting an axis of oscillating of the brake pedal, and a magnetic detection portion that detects the magnetic field of the magnetic circuit portion as at least four rotation angle sensors.

5. A brake system for driving and controlling a brake circuit that performs braking of a vehicle, the brake system comprising:

a brake pedal device having a brake pedal that is oscillatably provided around a predetermined axis with respect to a fixed body fixed to the vehicle:

a position detection device having at least four sensors that output signals according to an operation amount of the brake pedal depressed by a driver;

a first electronic control unit into which output signals of at least two of the at least four sensors are input in a distinguishable manner:

a second electronic control unit into which among the at least four sensors, output signals of at least two other sensors other than the sensor whose output signals are input to the first electronic control unit are input in a distinguishable manner; and a signal transmission unit configured to transmit the output signals of the at least two sensors input to one of the first electronic control unit and the second electronic control unit to the other of the first electronic control unit and the second electronic control unit in a distinguishable manner, wherein the first electronic control unit and the second electronic control unit identify an output signal indicating an abnormal value based on the output signals of at least four of the sensors, detect an operation amount of the brake pedal based on the plurality of output signals excluding the abnormal value, and drive and control the brake circuit, of the at least four sensors included in the position detection device, at least two sensors are rotation angle sensors outputting a signal corresponding to an angle at which the brake pedal oscillates around a predetermined axis as the operation amount of the brake pedal, and of the at least four sensors included in the position detection device, at least two sensors other than the rotation angle sensors are stroke sensors outputting a signal according to a moving distance of the brake pedal or a member that moves together with the brake pedal as the operation amount of the brake pedal.

6. The brake system according to claim 5, wherein the position detection device comprises:

a magnet-type rotation angle sensor having at least one magnetic circuit portion that forms a magnetic field in which magnetic flux travels in a direction intersecting an axis of oscillating of the brake pedal, and a magnetic detection portion that detects the magnetic field of the magnetic circuit portion as at least two rotation angle sensors; and an inductive sensor having at least one target formed of a conductor, at least one coil provided at a position facing the target in an axial center direction, and a receiving/transmitting circuits as at least two stroke sensors that detect the position of the target based on a change in inductance of the coil that changes due to an eddy current flowing through the target when alternating current is applied to the coil.

7. The brake system according to claim 1, wherein the brake system is configured as a complete brake-by-wire system in which components of the brake circuit and the brake pedal are not mechanically connected, and at least one of the first electronic control unit and the second electronic control unit receives the operation amount of the brake pedal based on the output signals of the plurality of sensors.

8. The brake system according to claim 1, wherein the four rotation angle sensors are provided around the axis of the brake pedal.

9. The brake system according to claim 1, wherein the four sensors have different rates of change in output voltage according to changes in the operation amount of the brake pedal.

* * * * *